(12) United States Patent
Keul et al.

(10) Patent No.: US 12,253,663 B2
(45) Date of Patent: Mar. 18, 2025

(54) CONTROL DEVICE FOR A MICROSCOPE (71) Applicant: Leica Microsystems CMS GmbH, Wetzlar (DE)

(72) Inventors: Oliver Keul, Nauborn (DE); Volker Schacht, Marburg (DE); Kai Ritschel, Heuchelheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 816 days.

(21) Appl. No.: 17/498,775

(22) Filed: Oct. 12, 2021

(65) Prior Publication Data
US 2022/0113531 A1 Apr. 14, 2022

(30) Foreign Application Priority Data

Oct. 14, 2020 (EP) .................................... 20201719

(51) Int. Cl.
G02B 21/36 (2006.01)
G02B 21/00 (2006.01)
G02B 21/24 (2006.01)
H04N 23/71 (2023.01)
H04N 23/75 (2023.01)

(52) U.S. Cl.
CPC ....... *G02B 21/365* (2013.01); *G02B 21/0032* (2013.01); *G02B 21/006* (2013.01); *G02B 21/008* (2013.01); *G02B 21/242* (2013.01); *H04N 23/71* (2023.01); *H04N 23/75* (2023.01)

(58) Field of Classification Search
CPC .............. G02B 21/365; G02B 21/006; G02B 21/36–362; G02B 21/0024; G02B 21/0032; G02B 21/0048; G02B 21/242; G02B 21/26; G02B 21/00; G02B 21/008; G02B 21/244; H04N 23/71; H04N 23/75
See application file for complete search history.

(56) References Cited

U.S. PATENT DOCUMENTS

| 6,621,628 | B1 | 9/2003 | Ogino |
| 2007/0007428 | A1 | 1/2007 | Ri |
| 2013/0153758 | A1 | 6/2013 | Lyu et al. |

(Continued)

OTHER PUBLICATIONS

Murphy, Douglas B.: "Fundamentals of Light Microscopy and Electronic Imaging; Chapter 12: Confocal Laser Scanning Microscopy," Dec. 2001, pp. 205-231, John Wiley & Sons, Inc., US.

*Primary Examiner* — Derek S. Chapel
*Assistant Examiner* — Adam W Booher
(74) *Attorney, Agent, or Firm* — LEYDIG, VOIT & MAYER, LTD.

(57) ABSTRACT

A control device for a microscope includes an operating device, an actuator and a processor. The operating device is configured to be operated by a user to vary focusing and/or positioning of an optical imaging system of the microscope relative to a sample. The actuator is configured to adjust an aperture of a detection pinhole which is included in the microscope so as to eliminate out-of-focus light from detection light which is directed by the optical imaging system onto a detector of the microscope. The processor is configured to detect a predetermined operating condition in response to a user operation of the operating device and to control the actuator to vary the aperture of the detection pinhole upon detection of the predetermined operating condition.

18 Claims, 2 Drawing Sheets (56) References Cited

U.S. PATENT DOCUMENTS

| | | |
|---|---|---|
| 2015/0145981 A1 | 5/2015 | Anhut et al. |
| 2017/0199362 A1* | 7/2017 | Schwedt .............. G02B 21/002 |
| 2018/0149853 A1* | 5/2018 | Honegger ............ H04N 23/673 |

* cited by examiner

CONTROL DEVICE FOR A MICROSCOPE

CROSS REFERENCE TO RELATED APPLICATION

This application claims benefit to European Patent Application No. EP 20201719.0, filed on Oct. 14, 2020, which is hereby incorporated by reference herein.

FIELD

The present invention relates to a control device for a microscope, in particular a confocal scanning microscope. Further, the present invention relates to a microscope and a method for controlling a microscope.

BACKGROUND

Conventional microscope systems such as confocal microscopes are configured to adjust a positional relationship between an optical imaging system, e.g. a microscope objective, and a sample in all three spatial directions X, Y, and Z in order to determine or find a sample region which is to be examined. Thus, a Z drive may be used to move a microscope stage holding the sample relative to the optical imaging system along an optical axis thereof in order to focus the optical imaging system onto the sample. Alternatively or additionally, a Z drive may be used to move the optical imaging system in a direction along its optical axis. Likewise, an X-Y drive may be provided which serves to move the microscope stage and the optical imaging system relative to each other in lateral directions perpendicular to the optical axis. The drives may be formed by motorized drive units which are operated by a user to find a sample region to be imaged while observing an image of the sample on a display device such as a monitor. Accordingly, although motorized drive units can be used, the user basically performs a manual operation to find a suitable target region of the sample.

Such a manual search may be a tedious process. This is especially true in fluorescence microscopy where the samples are fluorescent only in small sample regions. The search for fluorescent spots can take a lot of time in particular in flat samples and in case of confocal microscopy. Thus, a focal plane of the optical imaging system must be precisely brought into spatial coincidence with the sample layer to be observed in order to obtain a sufficient detection signal. Accordingly, the user often has to examine a large portion of the sample while observing the sample image on the monitor. Since a confocal image of a spatially extended sample region is generated point-by-point, it takes a relatively long time to update the resulting image on the monitor, especially in cases where the image data undergoes image processing before being displayed on the monitor. As a result, the user operation to find a suitable target region while observing an image update on the monitor is very time-consuming.

SUMMARY

In an embodiment, the present disclosure provides a control device for a microscope. The control device includes an operating device, an actuator and a processor. The operating device is configured to be operated by a user to vary focusing and/or positioning of an optical imaging system of the microscope relative to a sample. The actuator is configured to adjust an aperture of a detection pinhole which is included in the microscope so as to eliminate out-of-focus light from detection light which is directed by the optical imaging system onto a detector of the microscope. The processor is configured to detect a predetermined operating condition in response to a user operation of the operating device and to control the actuator to vary the aperture of the detection pinhole upon detection of the predetermined operating condition.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Embodiments of the present invention provide a control device for a microscope, a microscope, and a method for controlling a microscope which enables a user to find a sample region to be imaged more easily and faster.

In an embodiment, a control device for a microscope, in particular for a confocal scanning microscope, comprises an operating device configured to be operated by a user to vary focusing and/or positioning of an optical imaging system of the microscope relative to a sample. The control device comprises an actuator configured to adjust an aperture of a detection pinhole which is included in the microscope for eliminating out-of-focus light from detection light which is directed by the optical imaging system onto a detector of the microscope. The control device further comprises a processor configured to detect a predetermined operating condition in response to a user operation of the operating device and to control the actuator to vary, in particular to increase the aperture of the detection pinhole upon detection of the predetermined operating condition.

The control device enables a user to perform a search operation for a suitable target region of the sample to be imaged more easily and faster compared to conventional microscope systems. By increasing the aperture of the detection pinhole using a processor-controlled actuator, it is possible to automatically decrease the confocality of the microscope system and thereby to increase a size of a region along the optical axis from where light from the sample can be detected. In the following this will be described using the expression "depth of detection region". This can in particular be achieved by decreasing the suppression characteristics for out of focus light to be detected by the detector. This means that light from an increased region above and below the focus plane of the optical imaging system can be detected as well, compared to the size of the region above and below the focus plane which usually is detected by a "true confocal setting", e.g. with a detection pinhole having a diameter/size of for instance of 1 to 2 Airy units. Thus, it is possible to automatically increase a depth of a detection region from which the detector receives detection light emerging from the sample. Accordingly, an imaged sample region, which can be observed by the user e.g. on a monitor, is correspondingly enlarged when the user actuates an operating device in order to focus the optical imaging system onto the sample and/or to vary a lateral position of the optical imaging system relative to the sample. As a result, the search operation is accelerated, and the user receives a faster visual feedback when observing the continuously updated image on the monitor.

The control device is particularly well-suited for confocal imaging where the depth of detection region is small and an operation for focusing the optical imaging system onto the sample is time-consuming. Thus, when the focal plane of the optical imaging system is not precisely coincident with a target region of the sample including the fluorescent markers or spots, the resulting image on the monitor contains basically only noise and does not even allow a rough estimate of which focus change might be necessary to focus on the fluorescent markers or spots. In such a situation, the control device can be advantageously used to automatically increase the depth of detection region to speed up focusing process to be performed the user.

Although the control device is especially advantageous in terms of focusing, it may also be used to accelerate a search for fluorescent spots in lateral directions perpendicular to the optical axis of the optical imaging system. Thus, increasing the depth of detection region in response to a user operation of the operating device enlarges an axial sample region which is, so to say, laterally scanned when the sample and the optical imaging system are laterally shifted relative to each other during the search operation.

Since the control device enables the user to speed up the search operation, the time during which the sample is exposed to illumination light can be significantly reduced. Accordingly, photobleaching of light sensitive samples can be avoided and/or phototoxity of the illumination light for living samples can be reduced.

The predetermined operating condition may comprise a predetermined focusing mode provided by the operating device. The processor may be configured to control the actuator to increase the aperture of the detection pinhole upon detection of the predetermined focusing mode. According to this embodiment, the processor recognizes an activation of the predetermined focusing mode in response to a user operation of the operating device. The recognition of the predetermined focusing mode can be utilized to trigger a search supporting mode in which the aperture of the detection pinhole is varied, in particular increased compared to an aperture setting which is applied in an operating mode other than the search supporting mode.

In a preferred embodiment, the operating device is configured to selectively vary focusing of the optical imaging system in a coarse focusing mode at a first step size and/or at a first focusing speed and to vary focusing of the optical imaging system in a fine focusing mode at a second step size and/or at a second focusing speed. The first focusing speed may be larger than the second focusing speed, and the first step size may be larger than the second step size. The predetermined operating condition may comprise the coarse focusing mode. According to this embodiment, the search supporting mode may be activated when the user selects the course focusing mode.

Preferably, the processor is configured to control the actuator in the coarse focusing mode to set the aperture of the detection pinhole to a first size and to control the actuator in the fine focusing mode to set the aperture of the detection pinhole to a second size, said first size being larger than said second size. The size of the aperture of the detection pinhole can be adjusted or set in a stepwise manner—for instance, it can be increased or decreased by steps having a factor of e.g. 5% (or 10% or another suitable value) of a smallest or largest aperture value of the detection pinhole—or in a continuous manner where the aperture of the detection pinhole is increased or decreased by e.g. a continuous linear function or any other continuous mathematical function.

The processor may be configured to evaluate image data output from the detector. An evaluation of the image data can be used to support the user in a search operation for a suitable target region. For this purpose, the image data may be evaluated in terms of specific image parameters such as brightness/luminance, contrast, signal-to-noise ratio etc.

According to a preferred embodiment, the processor is configured to detect a target focusing state in which the optical imaging system is focused onto a target region of the sample based on the evaluation of the image data. For Instance, in case that the evaluation of the image data reveals that an image of a sample region exhibits high luminance, this sample region may be identified as the aforementioned target region of the sample.

The processor may be configured to detect the predetermined operating condition based on the evaluation of the image data. For example, in case that the evaluation of the image data reveals that the corresponding image exhibits low luminance, this luminance information may indicate the presence of the predetermined operating condition triggering the search supporting mode because a suitable sample region to be imaged has not yet been found.

The processor may further be configured to control the actuator based on the evaluation of the image data to adjust the aperture of the detection pinhole. Preferably, the evaluation of the image data comprises a luminance evaluation.

In a preferred embodiment, the processor may be configured to detect the predetermined operating condition in accordance with an average luminance represented by the image data. For instance, a low luminance which is averaged over the entire image may be a reliable indicator of the predetermined operating condition.

The processor may be configured to control an intensity of illumination light emitted by a light source of the microscope depending on the size of the aperture of the detection pinhole. This embodiment utilizes the fact that the ratio of the collected photons and the size of the aperture of the detection pinhole is known in advance. Based on this ratio, the detection pinhole can be controlled to avoid luminance variations.

Preferably, the processor is configured to control a scan speed of a scanning device of the microscope depending on the size of the aperture of the detection pinhole. For instance, in a confocal laser scanning microscope such a scanning device is used to direct the illumination and/or detection light such that the illumination light is scanned across the sample and to direct the detection light emerging from the sample onto the detector. In such a configuration, the scan speed can be increased in order to accelerate the scanning process in the search supporting mode so that the visual feedback experienced by the user during the search operation is improved.

The operating device may comprise a focus drive configured to cause relative movement between a microscope stage and the optical imaging system of the microscope along an optical axis thereof. The focus drive may be a motorized drive or manual drive. In addition or as an alternative, the operating device may comprise a motorized or manual X-Y drive which is configured to move a microscope stage holding the sample and the optical imaging system relative to each other in a lateral direction that is perpendicular to the optical axis. In case of a manual drive, the operating device may include a sensor or an encoder which is configured to detect an amount, by which the microscope stage and the optical imaging system are moved relative to each other, and to output a corresponding detection signal to the processor. Further, the operating device may comprise a remote control unit which can be operated by the user to control the respective drives. In any case, the operating device is not limited to the examples mentioned above. Any type of operating device can be used which enables the processor to detect a user operation based on which the detection pinhole is controlled as described herein.

According to another embodiment, a microscope, in particular a confocal microscope is provided. The microscope comprises a detector, an optical imaging system configured to direct detection light from a sample onto the detector, a detection pinhole configured to eliminate out-of-focus light from the detection light directed onto the detector, and a control device as described above.

According to another embodiment, a method for controlling a microscope is provided, wherein the microscope comprises a detector, an optical imaging system configured to direct detection light from a sample onto the detector, a detection pinhole configured to eliminate out-of-focus light from the detection light directed onto the detector, and an operating device configured to be operated by a user to vary focusing and/or positioning of the optical imaging system relative to the sample. The method comprises the following steps: detecting a predetermined operating condition of the microscope in response to a user operation of the operating device; and controlling an actuator to increase the aperture of the detection pinhole upon detection of the predetermined operating condition.

Figure 1:
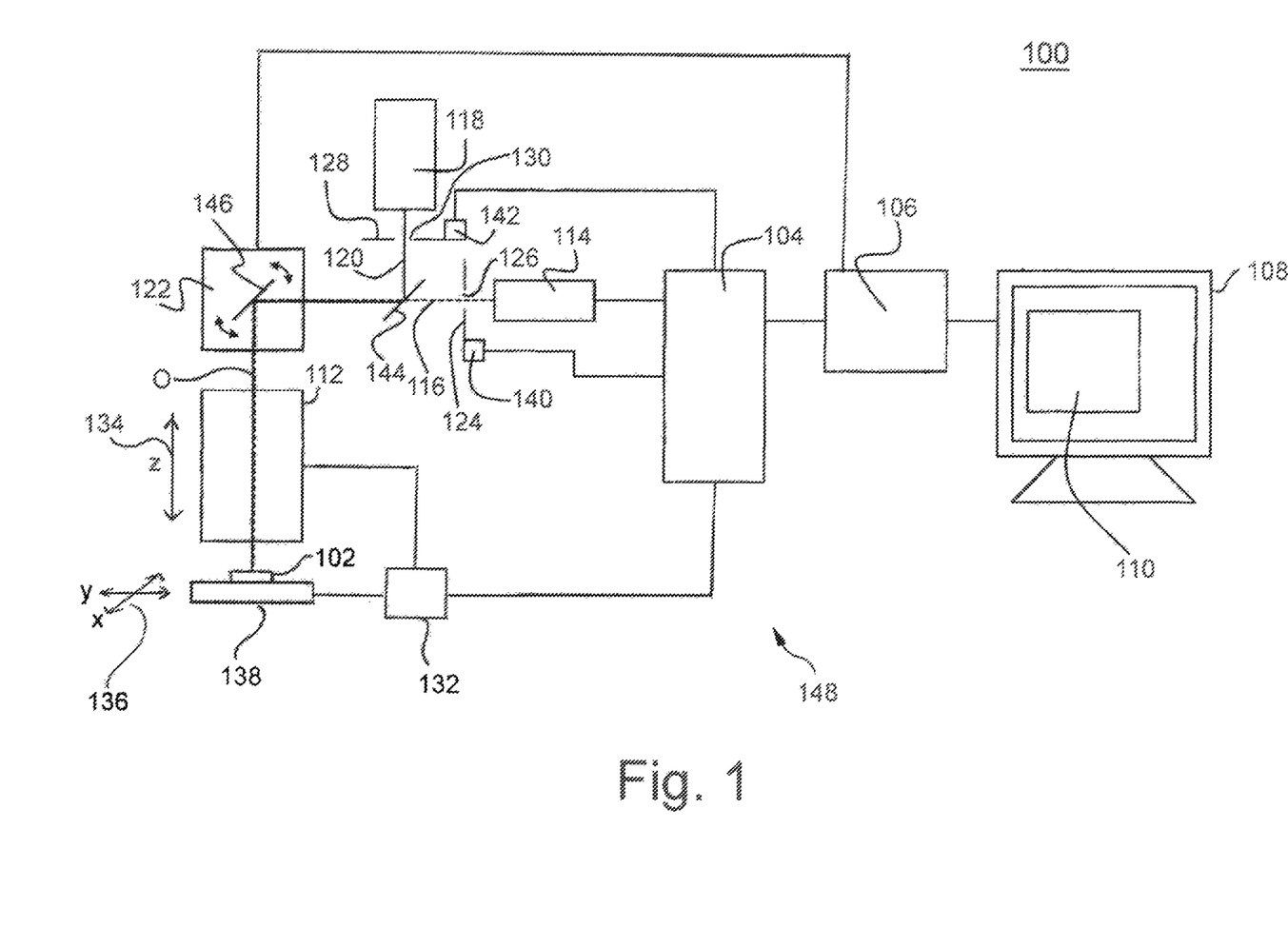
FIG. 1 is a schematic diagram of a confocal microscope comprising a control device according to an embodiment.

FIG. 1 shows a schematic diagram of a microscope 100 which may be configured as a confocal laser scanning microscope (CLSM). Thus, according to the present embodiment, the microscope 100 serves to perform point-by-point imaging of a sample 102 resulting in a sample image which is composed of a plurality of image points or pixels.

The confocal laser scanning microscope 100 comprises a processor 104 which may be connected to a computer 106. Further, a monitor 108 may be provided which is connected to the computer 106 and displays an image 110 of the sample 102.

The confocal laser scanning microscope 100 comprises an optical imaging system 112 which is configured to image a selected target region of the sample 102 onto a detector 114 formed e.g. by a point sensor. Detection light 116 emerging from one point of the sample 102 is directed by the optical imaging system 112 onto the detector 114 as illustrated by a dashed line in FIG. 1. It is to be noted that the optical imaging system 112 is depicted purely schematically as a single block in FIG. 1. However, the optical imaging system 112 may comprise a plurality of lens elements such as an objective facing the sample 102 and a tube lens located downstream thereof in an optical detection path.

The confocal laser scanning microscope 100 may further comprise a laser light source 118 which emits illumination light 120 which is guided through the optical imaging system 112 onto the sample 102 as illustrated by a solid line in FIG. 1. Accordingly, the optical imaging system 112 serves both to illuminate the sample 102 with the illumination light 120 and to direct the detection light 116 emerging from the illuminated sample 102 onto the detector 114. A beam splitter 144 may be provided for separating the optical detection path from the illumination path. The beam splitter 144 is formed e.g. by a dichroic mirror having spectral characteristics to reflect the illumination light 120 emitted by the laser light source 118 towards the sample 102 and to transmit the detection light 116 towards the detector 114.

In order to scan the illumination light 120 point-by-point through the sample 102, the confocal laser scanning microscope 100 includes a scanning device 122. According to the embodiment shown in FIG. 1, the scanning device 122 may comprise one or two tiltable mirrors 146 which are configured to scan the illumination light 120 across the sample 102 along lateral directions X and Y perpendicular to an optical axis O of the optical imaging system 112. The scanning device 122 not only acts on the illumination light 120, but the detection light 116 collected by the optical imaging system 112 from the sample 102 also enters the scanning device 122 when it is directed onto the detector 114. Accordingly, the embodiment shown in FIG. 1 provides for a so-called descanned configuration which allows to use a stationary point sensor in form of the detector 114 to receive the detection light 116, although the illumination light 120 performs lateral scan movements in X and Y directions across the sample 102.

The confocal laser scanning microscope 100 comprises a detection pinhole 124 which is located in front of the detector 114. The detection pinhole 124 has an aperture 126 defining a cross-section of the detection light 116 falling onto the detector 114. As explained below in more detail, the aperture 126 of the detection pinhole 124 can be adjusted in order to vary a depth of detection region from which the detection light 116 is received by the detector 114.

Optionally, the confocal laser scanning microscope 100 further includes an illumination pinhole 128 having an aperture 130 which defines a cross-section of the illumination light 120 emitted from the laser light source 118. Thus, the illumination pinhole 128 may be regarded as a point-type illumination source wherein the detection pinhole 124 is located in a plane in front of the detector 114 which is optically corresponding to the illumination pinhole 128. It is to be noted that the afore-mentioned illumination point source is not necessarily formed by an illumination pinhole. For example, a suitable optical fiber may be coupled to the laser light source 118, a light emitting end thereof forming a point source of illumination.

In order to find a suitable target region of the sample 102 which is to be observed, a positional relationship between the optical imaging system 112 and the sample 102 can be varied in all three spatial directions X, Y, Z, wherein Z is parallel to the optical axis O and X, Y are perpendicular to the optical axis 0. For this purpose, the confocal laser scanning microscope 100 includes an operating device 132 which can be operated by a user to vary Z focusing and X-Y positioning of the optical imaging system 112 relative to the sample 102. Just as an example, the operating device 132 may include a remote control which is manually operated by the user to activate an axial Z drive and a lateral X-Y drive. These drives are purely schematically illustrated in FIG. 1 as double arrows 134 and 136, respectively. The Z drive is operated by the user to perform a focusing operation in which an axial distance between the sample 102 and the optical imaging system 112 along the optical axis O is varied. Likewise, the X-Y drive 136 is operated by the user to perform a lateral positioning operation for shifting the sample 102 along the directions X and Y relative to the optical imaging system 112. The X-Y drive may be integrated with a microscope stage 138 which is movable perpendicular to the optical axis O along the lateral directions X and Y. The drives 134, 136 may be formed by motorized shafts which are configured to cause the intended movements along X, Y, and Z.

Needless to say that the afore-mentioned focus and lateral positioning mechanisms are to be understood merely as examples. For instance, rather than laterally moving the microscope stage 138, it is possible to move the optical imaging system 112 relative to a stationary microscope stage on which the sample 102 is located.

The confocal laser scanning microscope 100 comprises an actuator 140 which is configured to adjust the aperture 126 of the detection pinhole 124. Optionally, another actuator 142 may be provided for adjusting the aperture 130 of the illumination pinhole 128. Both actuators 140, 142 may be connected to the processor 104

As explained hereinafter, the confocal laser scanning microscope 100 comprises a control device generally referred to as 148 in FIG. 1, which enables the user to find a sample region to be imaged more easily and faster than in conventional microscope systems. According to the specific embodiment shown in FIG. 1, the afore-mentioned control device 148 may include the processor 104, the computer 106, the operating device 132 along with the Z and X-Y drives 134, 136 and the actuator 140 which can be driven to vary the aperture 126 of the detection pinhole 124. Optionally, the control device 148 may further include the actuator 142 for adjusting the size of the aperture 130 of the illumination pinhole 128.

Generally speaking, the processor 104 is configured to detect a predetermined operating condition in response to a user operation of the operating device 132 and to control the actuator 140 to vary, in particular to increase the aperture 126 of the detection pinhole 124 upon detection of the predetermined operating condition. When the aperture 126 of the detection pinhole 124 is increased, a depth of detection region from which the detection light 116 is received by the detector 114 is enlarged at the expense of a lower spatial resolution. As a result, a user operation to find a suitable sample region to be imaged is supported by increasing the depth of detection region at the expense of resolution.

More specifically, the control device 148 may provide a search supporting mode which is activated in case that the afore-mentioned operating condition is detected by the processor 104 in response to a user operation of the operating device 132 wherein the user operation indicates that the user intends to find a suitable sample region while observing the continuously updated image 110 on the monitor 108. The operating condition which triggers an activation of the search supporting mode may be suitably determined in advance such that the operation condition reliably indicates the intention of the user to perform a search operation for a suitable sample region.

According to the specific embodiment shown in FIG. 1, the processor 104 is connected with the operating device 132 to receive detection information from the operating device 132 when the latter is operated by the user. For instance, the operating device 132 may output detection signals to the processor 104 indicating that the user is actuating the operating device 132 to perform a focusing operation by means of the Z drive 134 and/or a positioning operation by means of the X-Y drive 136. Thus, the processor 104 is enabled to recognize the predetermined operating condition of the confocal laser scanning microscope 100 by detecting a situation where one of the afore-mentioned focusing and positioning operations is performed using the operating device 132. Recognition of the predetermined operation then triggers an activation of the supporting mode.

As an example, the operating condition may comprise a predetermined focusing mode which is provided by the operating device 132. When the user actuates the operating device 132 to enter the predetermined focusing mode, a corresponding detection signal is output from the operating device 132 to the processor 104. Based on the detection signal, the processor 104 recognizes that the predetermined focusing mode is set. Subsequently, the processor 104 activates the supporting mode. In the supporting mode, the processor 104 increases the aperture 126 of the detection pinhole 124 to a value which is larger than a predefined value that is applied before entering the supporting mode. The predefined value defines a size of the aperture 126 that allows an imaging operation with relatively short depth of detection region and thus high spatial resolution. By increasing the aperture 126 of the detection pinhole 124, the depth of detection region becomes larger, and the imaged sample region, which can be observed by the user based on the image 110 displayed on the monitor 108, is enlarged accordingly at the expense of a lower resolution. As a result, a search operation for a suitable sample region can be performed faster.

According to a specific embodiment, the control device 148 may be configured to provide at least two different focusing modes wherein one of these modes defines the operating condition triggering the supporting mode. For example, a coarse focusing mode may be provided in which focusing of the optical imaging system 112 can be varied at a first step size and/or at a first focusing speed. Further, a fine focusing mode may be provided in which focusing of the optical imaging system 112 is varied at a second step size and/or at a second focusing speed, wherein the first focusing speed is larger than the second focusing speed and the first step size is larger than the second step size. The processor 104 is configured to recognize on the basis of the detection signals output from the operating device 132 whether the coarse focusing mode or the fine focusing mode is selected by the user. In case that the coarse focusing mode is selected, the processor 104 controls the actuator 140 to set the aperture 126 of the detection pinhole 124 to a first size. On the other hand, in case that the fine focusing mode is selected, the processor 104 controls the actuator 140 to set the aperture 126 of the detection pinhole 124 to a second size which is smaller than the first size set in the coarse focusing mode. The second size of the aperture 126 may correspond to the afore-mentioned predefined value. In other words, the processor 104 controls the detection pinhole 124 in the coarse focusing mode to enlarge its aperture 126 so that the depth of detection region increases compared to the fine focusing mode. Thus, the search for a suitable target region to be imaged is facilitated in the coarse focusing mode.

The processor 104 may further be configured to evaluate image data output from the detector 114 and to use such an evaluation to support the user in a search operation for a suitable target region. For instance, the processor 104 may perform a luminance evaluation on the image data and utilize the luminance evaluation for recognizing whether or not the predetermined operating condition triggering the supporting mode is met. Just as an example, the processor 104 may recognize the predetermined operating condition as fulfilled when an average luminance represented by the image data is low.

An evaluation of the image data may also be used in order to detect a target focusing state in which the optical imaging system 112 is focused onto a target region of the sample 102.

For instance, in case that a luminance evaluation is performed on the image data, the processor 104 can detect the target focusing state by evaluating the average luminance of the current image. A continuous evaluation of the image data enables the aperture 126 of the detection pinhole 124 to be continuously adjusted based on the current image data. For example, the processor 104 may control the actuator 140 based on the current luminance so that the aperture 126 of the detection pinhole 124 is continuously readjusted depending on the luminance. If the luminance is low, the actuator 140 is controlled to increase the aperture 126. In contrast, if the luminance is high, the actuator 140 is controlled to decrease the aperture 126.

Optionally, the processor 104 is configured to control the laser light source 118 depending on the size of the aperture 126 of the detection pinhole 124. Thus, it is possible to adjust the intensity of the illumination light 120 emitted by the laser light source 118 in accordance with the aperture setting. For instance, the processor 104 may adjust the intensity of the illumination light 120 depending on the aperture setting such that luminance variations can be avoided to a large extent. In addition, controlling the intensity of the illumination light 120 depending on the size of the aperture 126 may be used to prevent any overexposure from occurring.

Further, the processor 104 may also be configured to control a speed of the scanning device 122 in accordance with the size of the aperture 126 of the detection pinhole 124. For instance, the scan speed can be increased in order to accelerate the scanning process in the supporting mode. This accelerates the feedback that is experienced by the user when searching for a suitable sample region by observing the image 110 on the monitor 108.

Figure 2:
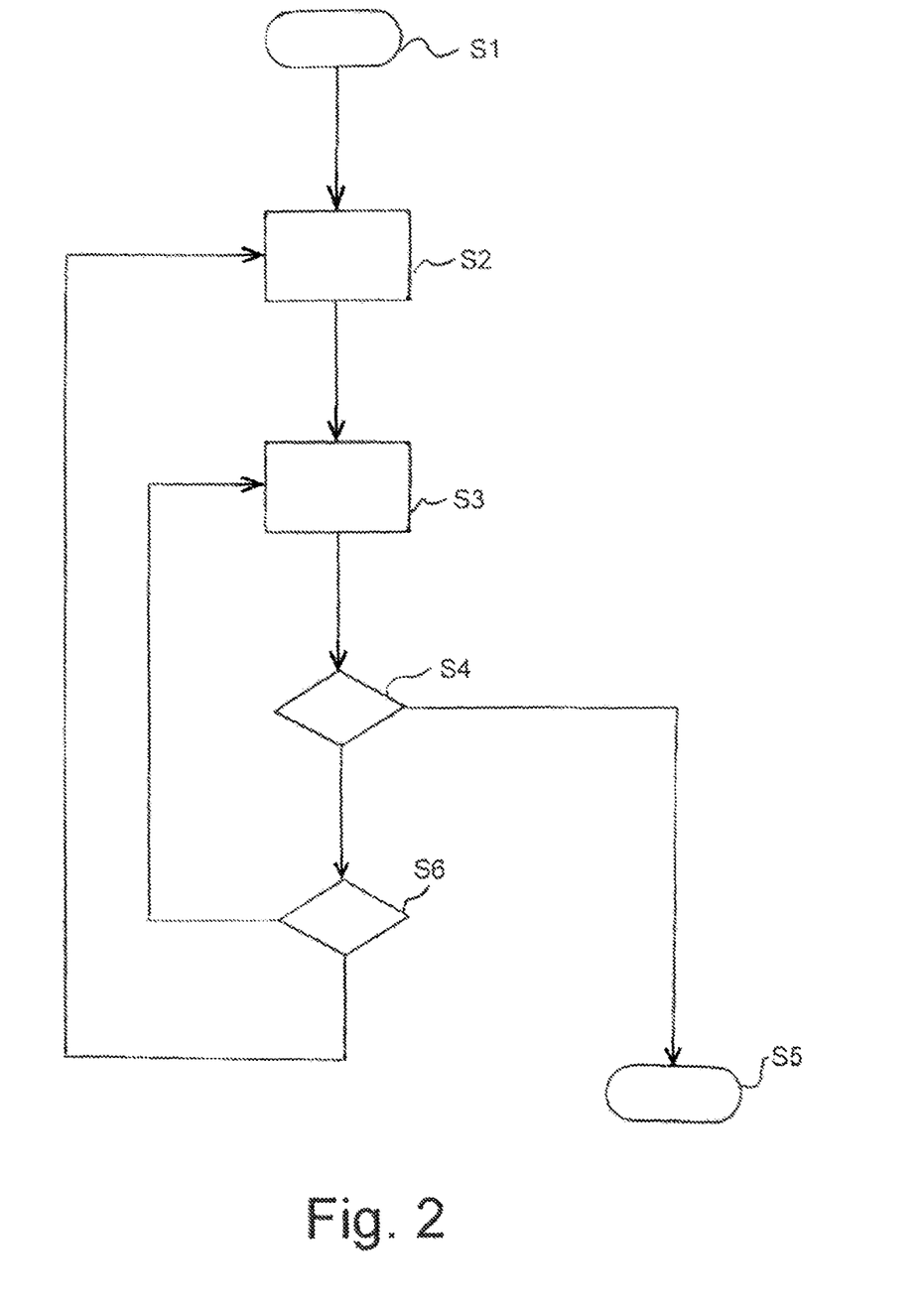
FIG. 2 is a flow diagram illustrating a method for controlling the microscope according to an embodiment.

FIG. 2 shows a flow diagram illustrating a method for controlling the confocal laser scanning microscope 100 according to an embodiment.

After starting the control operation of FIG. 2 with an initialization process in step S1, in which control parameters of the confocal laser scanning microscope 100 are initialized in accordance with a default setting, the control operation proceeds with step S2. In S2, the aperture 126 of the detection pinhole 124 is set. When S2 is executed for the first time, the aperture 126 is set to a predefined value which is applied to eliminate out-of-focus light in an operating mode other than the supporting mode.

In step S3, a confocal imaging process is performed by scanning the illumination light 120 across the sample 102 and receiving the detection light 116 on the detector 114 in accordance with a descanned configuration as explained above. Thus, the image 110 is displayed on the monitor 108. It is to be noted that steps S2 and S3 are depicted in FIG. 2 as being executed one after the other. However, S2 and S3 can also be executed simultaneously.

In step S4, a query is made whether or not the imaging process is to be stopped. If imaging is to be stopped, the control operation proceeds with step S5, and the control operation ends. If imaging is to be continued, the control operation proceeds with step S6.

In step S6, the processor 104 recognizes whether the predetermined operating state, which triggers an activation of the supporting mode in response to a user operation of the operating device 132, is present or not. If the predetermined operating state is recognized as not present in step S6, the process returns to step S3, and the confocal imaging process is executed again based on the predefined value of the aperture 126. Thus, confocal imaging is continued in accordance with the standard setting of the aperture 126 until imaging is stopped in step S5 or the predetermined operating state is recognized in step S6.

If the predetermined operating state is recognized as present in step S6, the control operation sets the supporting mode and returns to step S2 in which the aperture 126 of the detection pinhole 124 is changed from the predefined value to a larger value. In step S3, the confocal imaging process is performed in accordance with the increased aperture 126. Due to the increased aperture 126, the depth of detection region, from which the detection light 116 is received by the detector 114, is correspondingly greater in the supporting mode. Thus, image formation is accelerated in the supporting mode at the expense of a lower spatial resolution. The confocal imaging is continued in accordance with the increased aperture 126 until imaging is stopped in step S5 or until it is recognized in step S6 that the predetermined operating state is no longer given.

The embodiments as described above are to be understood merely as examples. For instance, although the above control operation provides only for an operating state-dependent setting of the detection pinhole 124, it is also possible to control the illumination pinhole 128 in accordance with the operating state of the confocal scanning microscope 100.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100 confocal laser scanning microscope
102 sample 104 processor
106 computer
108 monitor
110 image
112 optically imaging system
114 detector
116 detection light
118 laser light source
120 illumination light
122 scanning device
124 detection pinhole
126 aperture of detection pinhole
128 illumination pinhole
130 aperture
132 operating device
134 Z drive
136 X-Y drive
138 microscope stage
140 actuator
142 actuator
144 beam splitter
146 mirror
148 control device

What is claimed is:

1. A control device for a microscope, the control device comprising:
   an operating device configured to be operated by a user to vary focusing and/or positioning of an optical imaging system of the microscope relative to a sample;
   an actuator configured to adjust an aperture of a detection pinhole which is included in the microscope so as to eliminate out-of-focus light from detection light which is directed by the optical imaging system onto a detector of the microscope; and
   a processor configured to detect a predetermined operating condition in response to a user operation of the operating device and to control the actuator to vary the aperture of the detection pinhole upon detection of the predetermined operating condition,
   wherein the processor is configured to evaluate image data output from the detector, and
   wherein the processor is configured to control the actuator based on the evaluation of the image data to adjust the aperture of the detection pinhole.

2. The control device according to claim 1, wherein the microscope is a confocal microscope.

3. The control device according to claim 1, wherein the processor is configured to control the actuator to increase a size of the aperture of the detection pinhole upon detection of the predetermined operating condition.

4. The control device according to claim 1, wherein the predetermined operating condition comprises a predetermined focusing mode provided by the operating device, and wherein the processor is configured to control the actuator to increase the aperture of the detection pinhole upon detection of the predetermined focusing mode.

5. The control device according to claim 1, wherein the operating device is configured to selectively vary focusing of the optical imaging system in a coarse focusing mode at a first step size and/or at a first focusing speed, and to vary focusing of the optical imaging system state in a fine focusing mode at a second step size and/or at a second focusing speed, the first focusing speed being larger than the second focusing speed and the first size being larger than the second step size, and wherein the predetermined operating condition comprises the coarse focusing mode.

6. The control device according to claim 5, wherein the processor is configured to control the actuator in the coarse focusing mode to set the aperture of the detection pinhole to a first size and to control the actuator in the fine focusing mode to set the aperture of the detection pinhole to a second size, the first size being larger than the second size.

7. The control device according to claim 1, wherein the processor is configured to detect a target focusing state in which the optical imaging system is focused onto a target region of the sample based on the evaluation of the image data.

8. The control device according to claim 1, wherein the processor is configured to detect the predetermined operating condition based on the evaluation of the image data.

9. The control device according to claim 1, wherein the evaluation of the image data comprises a luminance evaluation.

10. The control device according to claim 9, wherein the processor is configured to detect the predetermined operating condition in accordance with an average luminance represented by the image data.

11. The control device according to claim 1, wherein the processor is configured to control an intensity of illumination light emitted by a light source of the microscope depending on a size of the aperture of the detection pinhole.

12. The control device according to claim 1, wherein the processor is configured to control a scan speed of a scanning device of the microscope depending on a size of the aperture of the detection pinhole.

13. The control device according to claim 1, wherein the operating device comprises a focus drive configured to cause relative movement between a microscope stage and the optical imaging system along an optical axis of the microscope.

14. A microscope, comprising:
    the control device according to claim 1;
    the detector;
    the optical imaging system configured to direct the detection light from the sample onto the detector; and
    the detection pinhole configured to eliminate out-of-focus light from the detection light directed onto the detector.

15. A method for controlling a microscope, the microscope comprising a detector, an optical imaging system configured to direct detection light from a sample onto the detector, a detection pinhole configured to eliminate out-of-focus light from the detection light directed onto the detector, and an operating device configured to be operated by a user to vary focusing and/or positioning of the optical imaging system relative to the sample, the method comprising:
    detecting, by a processor, a predetermined operating condition of the microscope in response to a user operation of the operating device; and
    controlling, by the processor, an actuator to vary the aperture of the detection pinhole upon detection of the predetermined operating condition, and
    evaluating, by the processor, image data output from the detector,
    wherein the processor is configured to control the actuator based on the evaluation of the image data to adjust the aperture of the detection pinhole.

16. The method according to claim 15, wherein the microscope is a confocal microscope.

17. The method according to claim 15, wherein the actuator is controlled to increase a size of the aperture of the detection pinhole upon detection of the predetermined operating condition.

18. A control device for a microscope, the control device comprising:
- an operating device configured to be operated by a user to vary focusing and/or positioning of an optical imaging system of the microscope relative to a sample;
- an actuator configured to adjust an aperture of a detection pinhole which is included in the microscope so as to eliminate out-of-focus light from detection light which is directed by the optical imaging system onto a detector of the microscope; and
- a processor configured to detect a predetermined operating condition in response to a user operation of the operating device and to control the actuator to vary the aperture of the detection pinhole upon detection of the predetermined operating condition,
- wherein the processor is configured to control a scan speed of a scanning device of the microscope depending on a size of the aperture of the detection pinhole.

* * * * *